United States Patent [19]

Emerson et al.

[11] Patent Number: 4,927,099
[45] Date of Patent: May 22, 1990

[54] AERODYNAMIC CONTROLLABLY VENTED PRESSURE MODULATING DROGUE

[75] Inventors: Richard C. Emerson; John B. Sherman, both of DeLand, Fla.

[73] Assignee: DeCel Incorporated, DeLand, Fla.

[21] Appl. No.: 188,489

[22] Filed: Apr. 29, 1988

[51] Int. Cl.⁵ .............................................. B64D 17/18
[52] U.S. Cl. .................... 244/152; 244/110 R; 244/142; 244/145
[58] Field of Search ................ 244/31, 110 R, 110 A, 244/110 D, 142, 145, 152

[56] References Cited

U.S. PATENT DOCUMENTS

| | | | |
|---|---|---|---|
| 3,011,742 | 12/1961 | Gross | 244/145 |
| 3,127,137 | 3/1964 | Downing | 244/145 |
| 4,117,993 | 10/1978 | Palm et al. | 244/145 |
| 4,178,706 | 12/1979 | Boyce | 40/326 |

FOREIGN PATENT DOCUMENTS

| | | | |
|---|---|---|---|
| 853261 | 11/1939 | France | 244/142 |
| 978042 | 11/1950 | France | 244/142 |

OTHER PUBLICATIONS 79-0467 Development and Initial Test Results of Parachutes with Automatic Inflation Modulation (AIM), Mr. David B. Webb, Member AIAA.

Primary Examiner—Joseph F. Peters, Jr.
Assistant Examiner—Anne Sartelle
Attorney, Agent, or Firm—Bernard, Rothwell & Brown

[57] ABSTRACT

An aeronautical drogue having a canopy and support members connecting the canopy to a connector provides for essentially constant drag at variable speeds by aerodynamic pressure modulation through controllably venting the canopy by constructing the canopy of a plurality of separate elastic bands positioned side by side the elastic bands being connected at spaced intervals by flexible connections.

7 Claims, 2 Drawing Sheets

AERODYNAMIC CONTROLLABLY VENTED PRESSURE MODULATING DROGUE

FIELD OF THE INVENTION

This invention relates to improvements in aerodynamic drogues and particularly to a unique drogue having aerodynamic pressure modulation to provide essentially constant drag.

PRIOR ART

Aerodynamic drogues are known in the prior art. One common, but not the only, use of the aeronautic drogue is for stabilizing the hose of a tanker aircraft for connecting to the probe of an aircraft to be refueled in flight.

Tanker aircraft used in refuelling operations are commonly required to refuel aircraft having widely differing speeds. For example, a single tanker may be required to refuel both helicopters and fixed-wing jets. Because of the widely varying speed of such aircraft, it has in the past been necessary to utilize two different drogues because of the difference in drag force caused by the differing speeds and altitudes of operation.

The problem of providing a constant drag for aeronautical/aerodynamic drogues at varying speeds and varying altitudes has been a vexing problem for years without solution. There is a need in the art to provide a constant drag drogue without extensive mechanical parts or adjustments, not only for the aircraft refuelling art but for other areas of creating aerodynamic resistance including parachutes, parabrakes, airplane retarders and the like.

Prior attempts to achieve such results have relied upon controlling the area of inflation of the drogue (or parachute) to provide the fabric with variable permeability such, however, are so difficult to accomplish in practice that none of such attempts have been completely successful.

SUMMARY OF THIS INVENTION

This invention provides an aeronautic drogue having essentially constant drag at variable speeds and altitudes. The drogue is of the type having a plurality of support members which support members have one end attachable to a connection, such as for pulling the drogue and the other end attached to a canopy. The constant drag is achieved by a self-venting construction of the canopy. This self-venting construction is preferably accomplished by constructing the canopy of a plurality of separate adjacent elastic bands which are connected at spaced intervals by elastic connectors. Such an arrangement provides controlled venting and directing of the pressures to equalize the system and provides essentially constant drag regardless of speed or altitude.

DETAILED DESCRIPTION OF THE PREFERRED EMBODIMENT

Figure 1:
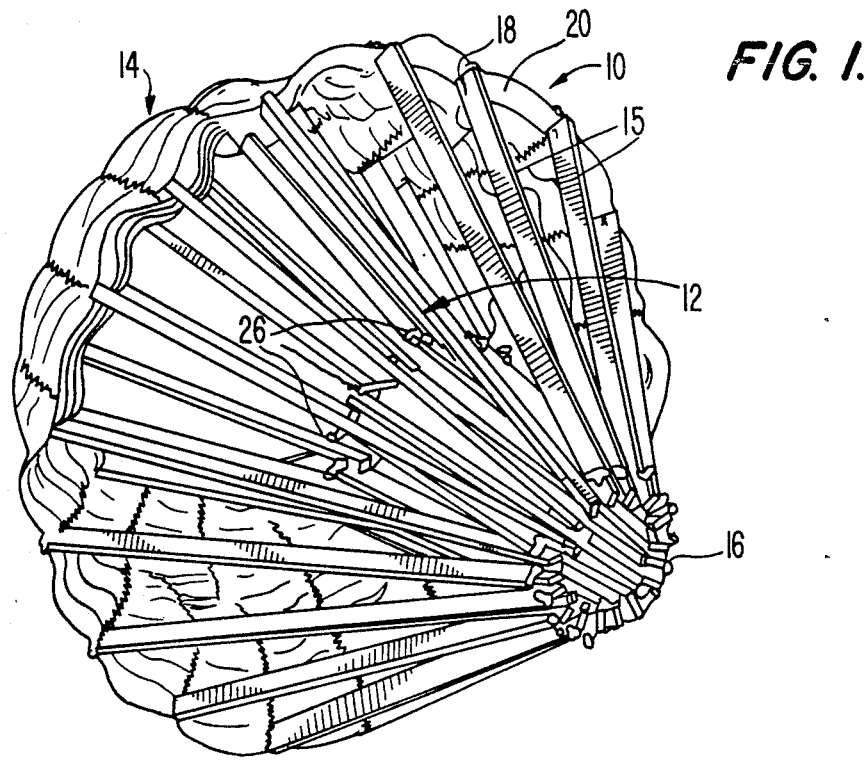
FIG. 1 is a perspective view of the drogue of this invention viewed from one end.
Figure 2:
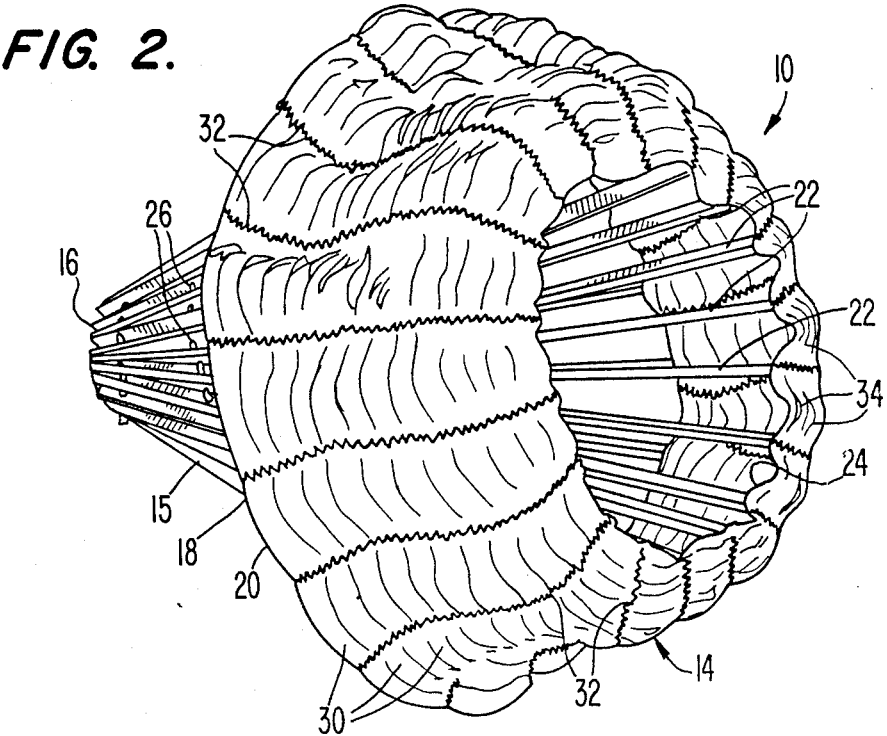
FIG. 2 is a perspective view of the drogue viewed from an opposite end.

Shown in FIGS. 1 and 2 the drogue 10 of this invention consists of a plurality of support members 12 and a canopy 14. The term "drogue" as used herein refers to any aerodynamic retarder such as a parachute or parabrake of the type using at least a canopy connected to a load. All of the support members 12 are connected together at one end by connection 16 which may, in the environment of a refuelling tanker, provide a hole for the refuelling conduit. The members 12 may be pivotally connected at connection 16 so as to allow movement inward and outward as the drogue is moved at varying speeds. Some of the members 15 are connected at ends 18 to an outer edge 20 of the canopy while other members 22 are connected to an inner edge 24 of the canopy. The members 22 may have pivotal connections 26 in the center. Although the connections are shown as solid members 15 and members 22 with pivot connections 26 such is not essential as the invention works equally well with any sort of connecting or support members including lines, rope or other means of connecting the canopy 14 to the connection while allowing the canopy to create drag.

Figure 4A:
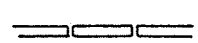
FIGS. 4a and 4b are illustrations of alternative embodiments of the drogue bands.
Figure 4B:

It is the canopy construction which constitutes the unique feature of this invention. The canopy 14 is preferably formed from a plurality of elastic bands 30, the bands being adjacent one another either overlapping, edge abutting, or almost edge abutting and not connected at their side edges. As shown in FIG. 4a the elastic bands 30 are overlapping but as shown in FIG. 4b they are edge abutting. The bands are secured in place by flexible connectors such as a stitched elastic thread 32 spaced circumferentially around the canopy bands. Any suitable flexible or elastic connection circumferentially spaced around the elastic bands will accomplish the result. The inmost bands of the canopy have a smaller diameter than the outermost in order to create a canopy shape as shown in the drawing. Under pressure the areas 34 adjacent the edges of the bands 30 open to allow pressure modulation.

This drogue canopy construction provides for the automatic pressure modulation and the constant drag at variable speeds and altitude as will be explained as best as presently understood.

Figure 3:
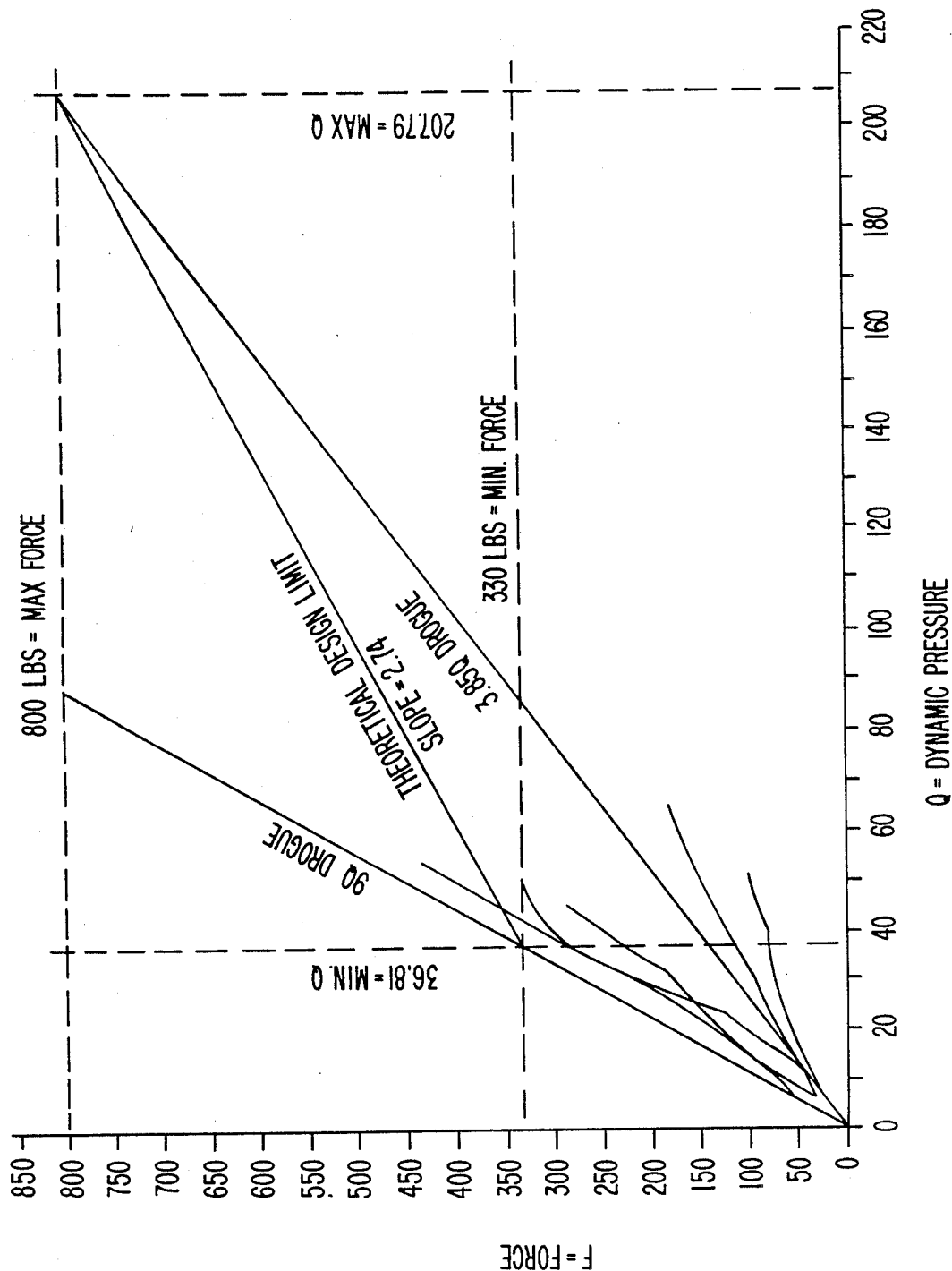
FIG. 3 is a chart plotting force versus dynamic pressure of prior art aeronautic drogues and the present invention.

The basic formula for drag force is $F = Q \times Cd \times Fa$ where F equals drag force, Q equals dynamic pressure (one half rho times velocity squared), Cd equals the coefficient of drag, and Fa equals frontal area. FIG. 3 is a plot of force (F) against dynamic pressure (Q) for a known 3.85 Q high speed drogue and a known 9Q low speed drogue within the operating envelope of the refuelling aircraft. Also shown in FIG. 3 is the minimum performance range of a theoretical drogue which could be defined in terms of F versus Q.

Reverting to the formula set forth above, it can be seen that if F is constant and Q, by definition, is variable with velocity and altitude, then $Cd \times Fa$ must vary essentially in an inverse relationship to Q. As Q increases, $Cd \times Fa$ must decrease accordingly. This invention discovered that the effective pressure area: $(Cd) \times (Fa)$ could be automatically modulated by varying the pressure of the drogue within the canopy rather than by modifying its physical size. The present invention changes the physical shape through expansion allowed by the use of elastic material, but more significantly the effective pressure area itself is being modified by pressure equalization. It was discovered that the way to vary Cd ×Fa was to vary the pressure throughout the entire canopy, i.e., with each segment throughout the canopy to achieve aerodynamic pressure modulation applied to the entire canopy. In other words, each lateral segment of the canopy can expand with regard to another lateral segment. As can be seen, the present invention achieves this through the use of elastic or stretchable tapes connected to provide a canopy, but the elastic bands or tapes themselves are connected by further means such as flexible radial connectors.

Wind tunnel tests show that at varying speeds the canopy does indeed modulate its system pressures throughout the speed range in the wind tunnel. The cycle of opening and closing of the lateral slots 34 is evident from a video record and when the speed increases the frequency of the cycle correspondingly increases.

As a non-limiting example of a model constructed for wind tunnel tests to illustrate the present invention a one-third scale model utilizing canopy constructed of elastic bands of composite nylon and elastic material ½" wide and 0.030" thick resulted in an F versus Q plot as shown in FIG. 3. This had an average slope of 1.82, well below the theoretical design limit of 2.74. The drogue inflated quickly and aerodynamic pressure modulation occurred from a force of 90 lbs. throughout the remainder of the test. Aerodynamic pressure modulation occurs from the onset of the test. As the Q increases in the test the Cd ×Fa consistently decreases which corroborates the fact that automatic pressure modulation occurs due to the design throughout the range of testing.

Although the invention has been described with regard to its applicability to aircraft aeronautic drogues, the invention could be equally applicable to any other sort of aerodynamic drogue where constant pressure with a varying rate of speed is desired. Typically such applications include parabrakes for surface vehicles and aircraft, parachutes for personnel and material, recovery of air and space vehicles, and numerous others uses.

What is claimed is:

1. An aeronautical drogue including a plurality of support members, the support members having one end attachable to a connection means and the other end connected to a canopy, the canopy being formed of elastic material and having a generally annular or circular shape, the drogue providing an essentially constant drag/force at variable speeds and altitude with means for controllably venting the entire canopy to achieve aerodynamic pressure modulation so that the effective pressure area within the canopy of the drogue is modulated by equalizing the system pressure of the drogue from within the canopy; the venting means comprising a plurality of vent holes throughout the elastic canopy, the vent holes being geometrically and symmetrically arranged to allow pressure modulation and direction.

2. An aerodynamic drogue of the type including a plurality of support members, the support members having one end attachable to a connection means and the other end connected to a canopy, the canopy being of generally annular or circular shape, with improvement for providing an essentially constant drag/force at variable speeds and altitude, the improvement comprising: means for controllably venting the entire canopy to achieve aerodynamic pressure modulation so that the effective pressure area within the canopy of the drogue is modulated by equalizing the system pressure of the drogue from within the canopy; wherein the means for controllably venting the canopy to achieve aerodynamic pressure modulation to provide a constant drag at variable speeds and altitudes comprises a canopy constructed of a plurality of separate elastic bands positioned side by side, means connecting the bands at spaced intervals around the circumference of the canopy so that the expansion of the elastic bands allows pressure modulation within the drogue canopy.

3. An aerodynamic drogue as defined in claim 2 wherein the means for connecting the bands are flexible means.

4. An aerodynamic drogue as defined in claim 3 wherein the flexible means comprises elastic stretching material.

5. An aerodynamic drogue of the type including a plurality of support members, the support members having one end attachable to a connection means and the other end connected to a canopy, the canopy being of generally annular or circular shape, with improvement for providing an essentially constant drag/force at variable speeds and altitude, the improvement comprising: means for controllably venting the entire canopy to achieve aerodynamic pressure modulation so that the effective pressure area within the canopy of the drogue is modulated by equalizing the system pressure of the drogue from within the canopy; wherein the means for controllably venting the canopy to achieve aerodynamic pressure modulation to provide a essentially constant drag/force at variable speeds and altitudes comprises a canopy constructed of a plurality of separate elastic bands positioned in overlapping relationship, means connecting the bands at spaced intervals around the circumference of the canopy so that the expansion of the elastic bands allows pressure modulation within the drogue canopy.

6. An aerodynamic drogue as defined in claim 5 wherein the means for connecting the bands are flexible means.

7. An aerodynamic drogue as defined in claim 6 wherein the flexible means comprises elastic stretching material.

* * * * *